Sept. 14, 1937.  J. GALBRAITH  2,093,010
CARVING MACHINE
Filed July 6, 1936  6 Sheets-Sheet 3

INVENTOR
JOHN GALBRAITH
BY Paul, Paul Moore
ATTORNEYS

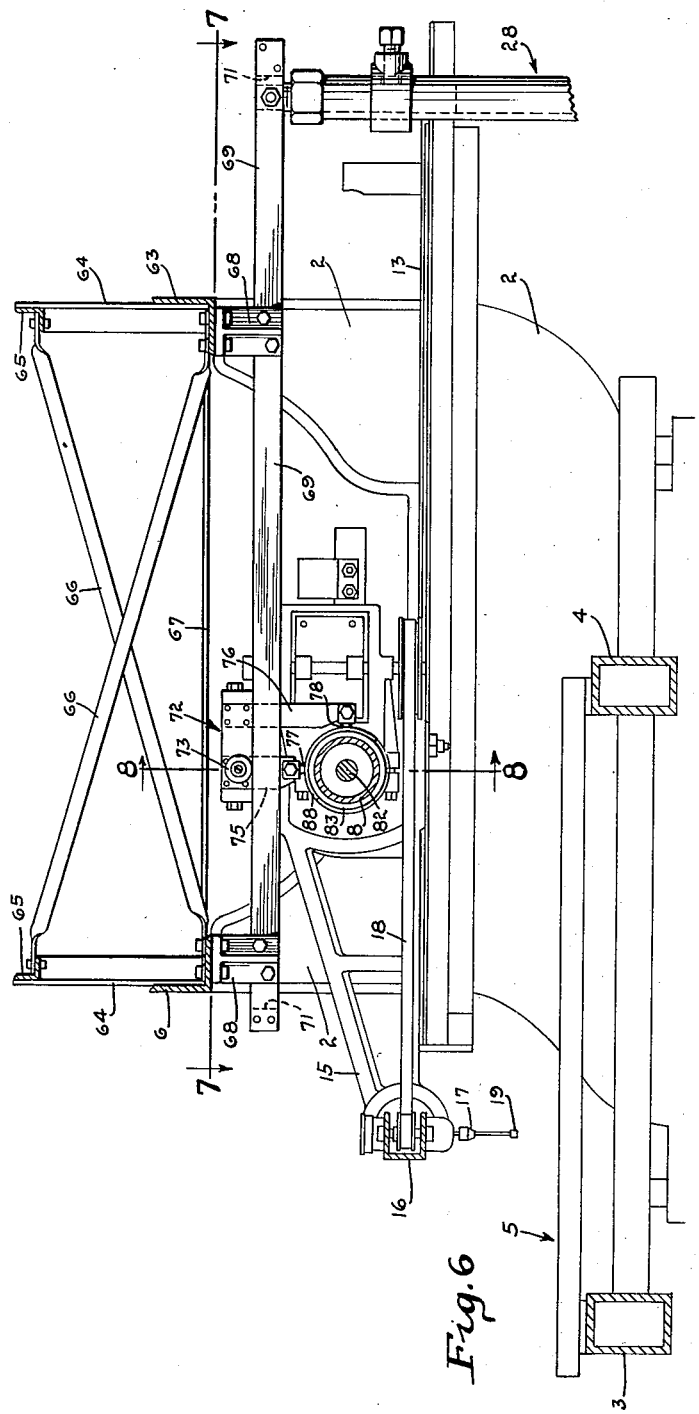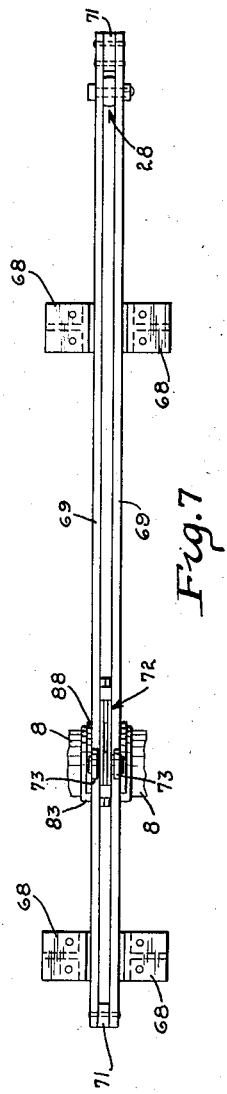

Sept. 14, 1937.  J. GALBRAITH  2,093,010
CARVING MACHINE
Filed July 6, 1936  6 Sheets-Sheet 5

INVENTOR
JOHN GALBRAITH
BY Paul, Paul & Moore
ATTORNEYS

Sept. 14, 1937.  J. GALBRAITH  2,093,010
CARVING MACHINE
Filed July 6, 1936  6 Sheets-Sheet 6
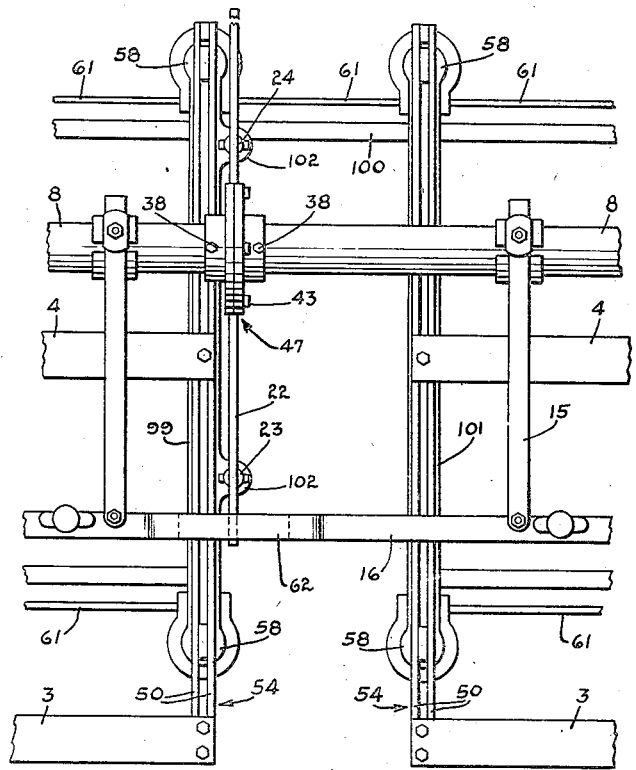
Fig.11
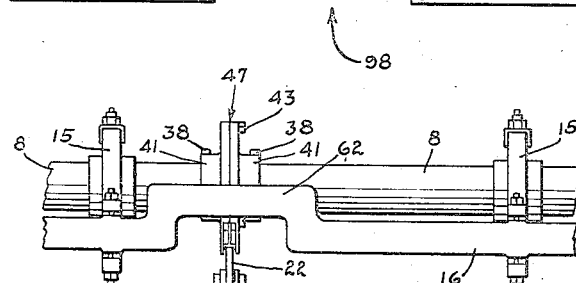
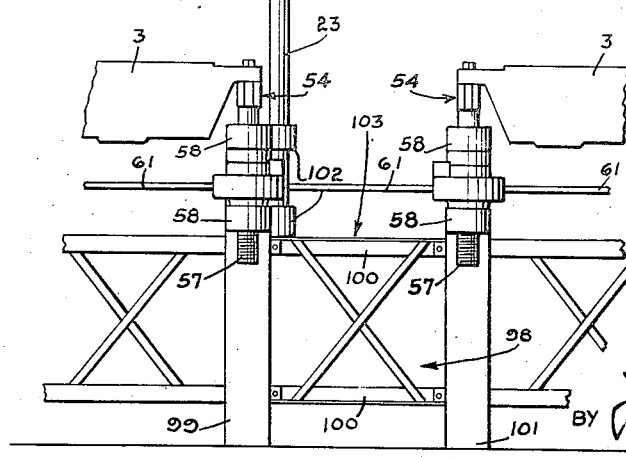
Fig.12
INVENTOR
JOHN GALBRAITH
BY Paul Paul Moore
ATTORNEYS Patented Sept. 14, 1937

2,093,010

UNITED STATES PATENT OFFICE 2,093,010

CARVING MACHINE

John Galbraith, Minneapolis, Minn.

Application July 6, 1936, Serial No. 89,005

18 Claims. (Cl. 90—13.2)

This invention relates to new and useful improvements in carving machines, and more particularly to such machines of the general character illustrated in my pending application, Serial No. 20,041.

In machines of this character, it is of utmost importance that the carriage which supports the cutting tools be so supported that it cannot vibrate or chatter, when the tools are engaged with the work. It is now common practice to support the carriage upon the machine frame at its ends only. When the carriage is thus supported, and the machine is of large capacity or, in other words, is made relatively long, so as to accommodate a large number of pieces, the carriage is correspondingly lengthened, which may cause it to sag or deflect at its intermediate portion, because of the weight of the cutter bar and tools thereon and from strains exerted on the cutter bar as a result of the tools engaging the work. Such sagging of the cutter bar is, of course, objectionable, and it is therefore desirable that means be provided for supporting the intermediate portion of the carriage, whereby it cannot be deflected from weight or strains, and whereby it will not chatter or vibrate when the machine is in operation, and also whereby the oscillatory movement of the cross member of the carriage is not interfered with.

An important object of the present invention, therefore, is to provide a center support for the carriage of a carving machine, whereby the intermediate portion of the carriage is suitably supported, thereby to eliminate vibration and prevent the cutting tools from chattering.

A further and more specific object is to provide a center support comprising a track mounted over the work table and suitably supported on the machine frame and adapted to be engaged by a wheel mounted on the intermediate portion of the carriage, which preferably is of the same diameter as the wheels at the ends of the carriage, whereby the latter may roll freely back and forth upon the tracks during the operation of guiding the follower around the pattern secured to the work table.

A further object is to provide a center support comprising an overhead track which preferably is supported from a structural frame disposed over the machine, and having its ends suitably supported on the machine frame, and the carriage having a trolley secured to the intermediate portion thereof adapted to travel on said track, thereby to support the intermediate portion of the carriage.

Other objects reside in the specific construction and arrangement of the center support; in the construction of the carriage which comprises a plurality of tubular members arranged in axial alinement and suitably coupled together at their inner ends by coupling members cooperating to provide a split housing having a carrying wheel mounted therein adapted to travel on a fixed track, and which housing is so constructed that the carriage may be freely oscillated on the tracks, regardless of its traveling movement thereon; in the means provided for constantly wiping the center track to prevent the accumulation of foreign matter thereon when the carriage is moved forwardly and backwardly over the work table; in the provision of a center support which may readily be embodied in the construction of a conventional wood carving machine, thereby to prevent the intermediate portion of the carriage from deflecting from its true axial alinement, which is more or less common in machines having no center support for the carriage, and whereby such machines may be made to produce accurate work regardless of the size of the machine and the nature of the work; and, in the novel construction of the machine frame, whereby a passageway or station is provided at the center of the machine within the confines of the machine frame, whereby an operator may be stationed in close proximity to the usual pattern so that he may conveniently guide the usual follower around on the pattern, with a minimum of effort, regardless of the size and nature of the work.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 6 is a view showing a center supporting rail or track suspended from a frame disposed over the machine table;

Figure 7 is a sectional plan view on the line 7—7 of Figure 6;

Figure 11 is a detail view showing a machine comprising a frame so constructed at its center as to provide a station for an operator located within the confines of the machine frame;

Figure 12 is a front elevation of Figure 11.

Figure 1:
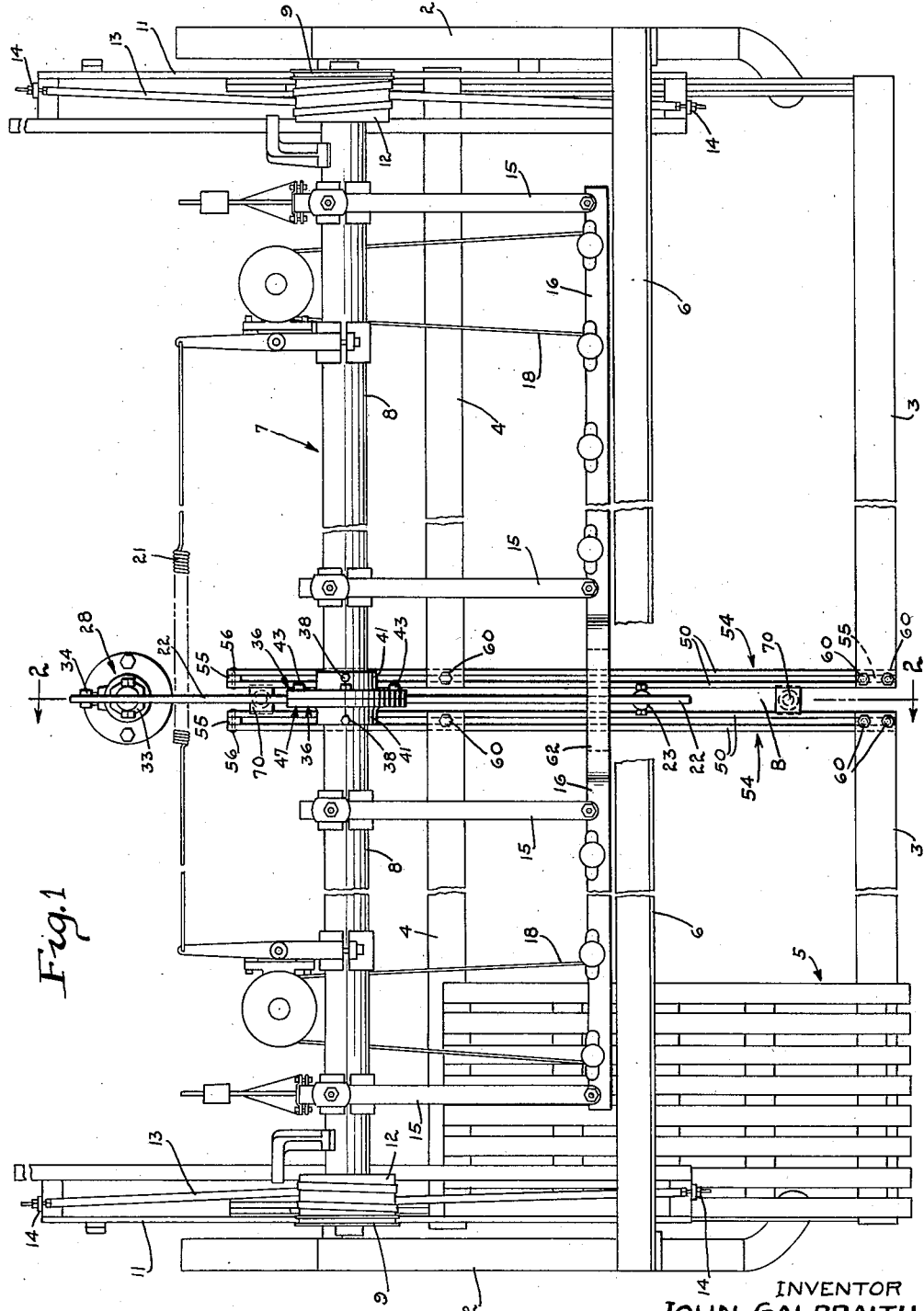
Figure 1 is a plan view of a wood carving machine showing the invention embodied in the construction thereof.
Figure 2:
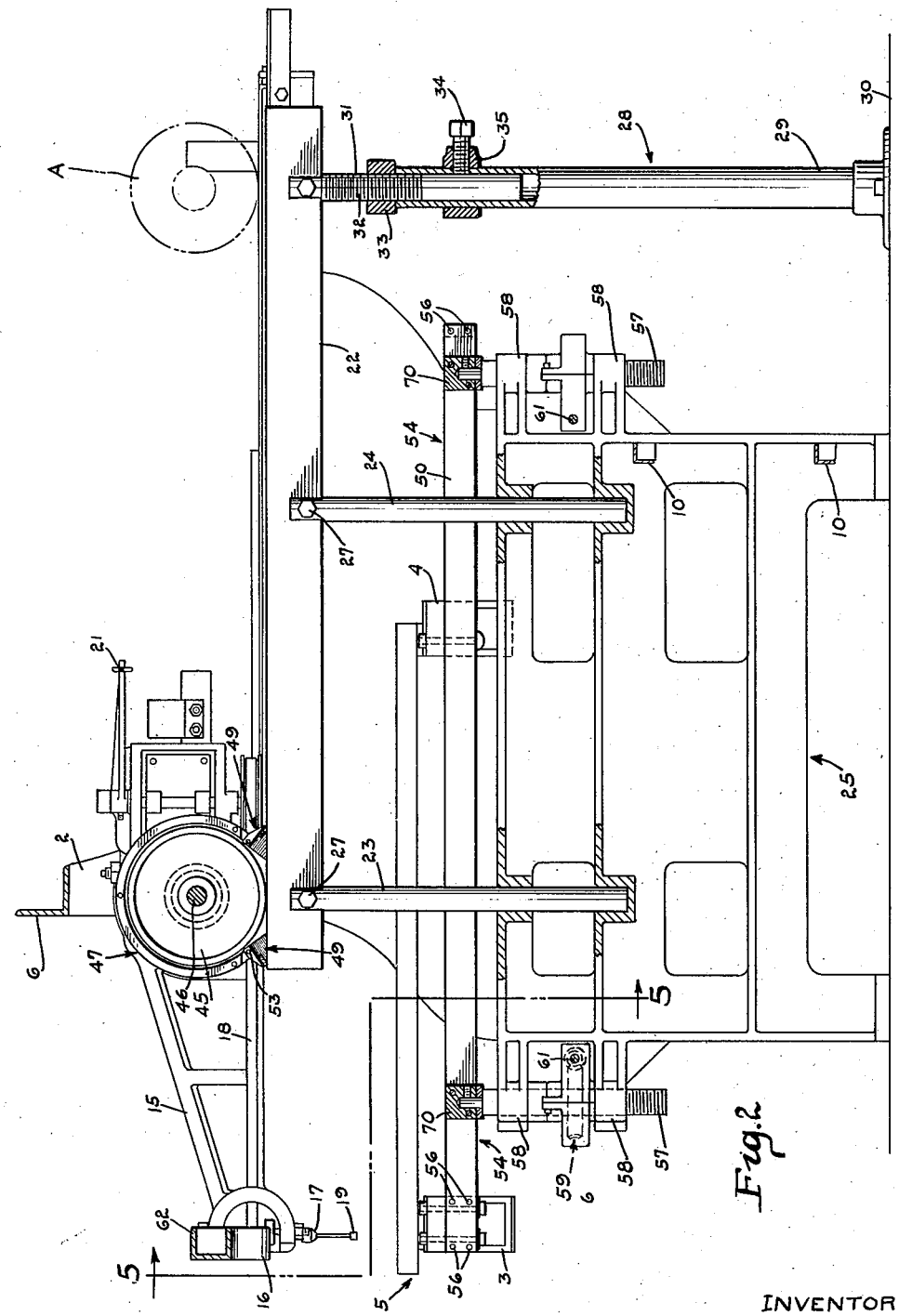
Figure 2 is a cross-sectional view on the line 2—2 of Figure 1, showing the preferred manner of supporting the center track on the machine frame.

In the selected embodiment of the invention here shown, there is illustrated in Figures 1 and 2, for purposes of disclosure, a carving machine comprising side frame members 2—2, suitably connected together by longitudinally extending rails 3 and 4. The rails 3 and 4 are shown each comprising two sections secured together at the center of the machine, as best illustrated in Figure 1. The usual work supporting table, generally indicated by the numeral 5, is removably supported on the rails 3 and 4. A longitudinally extending rail 6 is shown connecting together the upper portions of the side frame members 2, and rails 10 connect together the lower rear portions thereof.

The carriage, generally indicated by the numeral 7, is shown comprising a main supporting member 8, composed of two sections, preferably tubular in cross-section, coupled together at the center of the machine, as best shown in Figures 1 and 2, and as will be subsequently described. The outer ends of the tubular member 8 are provided with suitable flanged carrying wheels 9 mounted to travel on tracks 11 secured to the machine frame. Suitable drums 12 are secured to the wheels 9 for direct rotation therewith and have flexible bands 13 wound thereon, each having one end secured to the drum and their opposite ends to the machine frame, as indicated at 14 in Figure 1.

A plurality of arms 15 are mounted on the supporting member 8 of the carriage, and are arranged for swinging movement about vertical axes. The arms 15 carry at their forward ends, the usual tool supporting or cutter bar 16, provided with spindles driven by suitable belt drives 18. The usual cutting tools 19, shown in Figure 2, are removably supported in the spindles 17 in the usual manner. Suitable means, such as a spring 21 is provided for maintaining the belt drives 18 taut.

Figure 3:
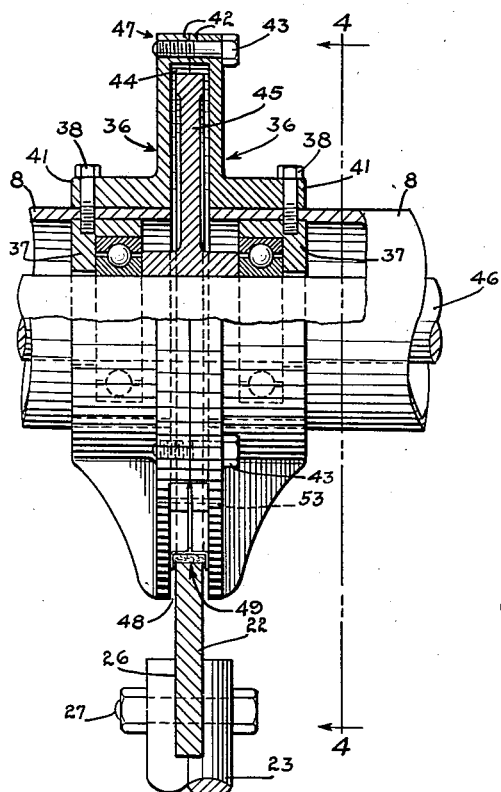
Figure 3 is an enlarged detail view of the intermediate portion of the carriage partially broken away to more clearly illustrate the construction thereof.
Figure 4:
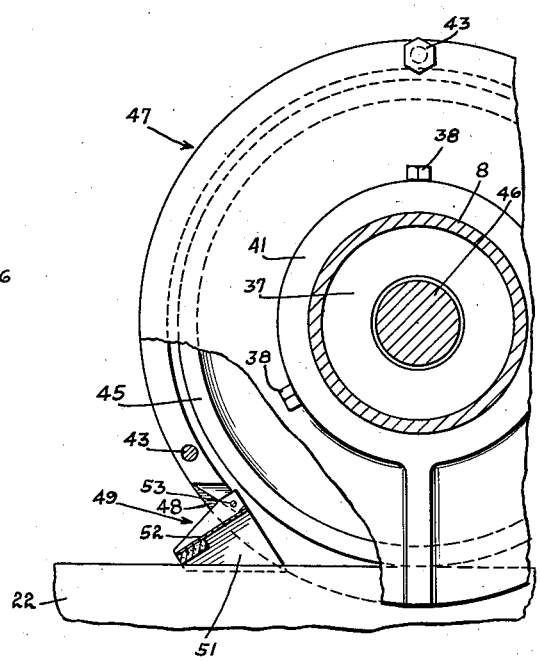
Figure 4 is a detail sectional view on the line 4—4 of Figure 3, showing one of the wiper elements.
Figure 5:
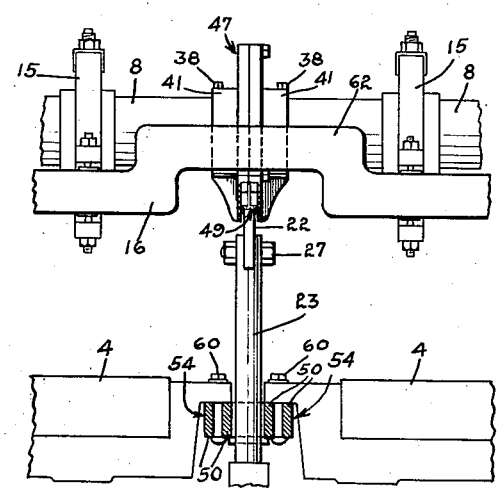
Figure 5 is a detail sectional view on the line 5—5 of Figure 2, showing the construction of the cutter bar at the intermediate portion of the machine.

An important feature of the present invention resides in the means provided for supporting the intermediate portion or center of the carriage, whereby the member 8 cannot deflect as a result of weight or strains imparted thereto, when the machine is in operation, and whereby it can be freely oscillated on its axis in the usual manner. Such means is best shown in Figures 1, 3, and 4, and comprises a track 22, shown supported at the upper ends of suitable posts 23 and 24, having their lower ends received in suitable sockets provided in an intermediate frame member, generally indicated by the numeral 25. The upper ends of the posts 23 and 24 are preferably slotted, as shown at 26 in Figure 3, to receive the track 22, and the latter is secured to the posts by suitable bolts 27.

The track 22 extends rearwardly of the frame member 25 to provide ample travel for the carriage 7, which, in the present instance, is adapted to travel rearwardly to the dotted line position, indicated at A in Figure 2. The rear end of the rail 22 is shown supported upon an upright post, generally indicated by the numeral 28, the lower section 29 of which may be suitably secured to the floor 30 or some other support. A member 31 is adjustably supported in the upper end of the section 29 of the post 28, and is threaded, as shown at 32, to receive an adjusting nut 33, which is supported upon the upper end of the section 29, and whereby the length of the post 28 may be varied to provide a suitable support for the rear end of the track 22. A suitable lock screw 34 is received in threaded engagement with a collar 35 secured to the section 29, and passes through an aperture in the wall thereof, whereby the screw 34 may be manipulated to lock the member 31 in adjusted position. The upper edge of the center track 22 is horizontally alined with the end tracks 11, and is arranged in parallel relation thereto, whereby the carriage may roll freely backwardly and forwardly on said tracks.

As best shown in Figures 1 and 3, the tubular sections 8—8 of the carriage 7 are coupled together at the center of the machine by suitable coupling members, generally indicated by the numeral 36. These coupling members are provided with hubs bored to receive the adjacent ends of the sections 8, and suitable bearing members 37 are fitted into the ends of the sections 8. Screws 38 pass through suitable apertures provided in the hubs 41 of the coupling members 36 and the walls of the tubular sections 8, and may have their inner ends received in threaded engagement with the bearing members 37, as clearly illustrated in Figure 3. If desired, other means may be provided for fixedly securing the coupling members 36 and bearing members 37 to the tubular sections 8—8 of the carriage.

The outer marginal edges of the clamping members 36 are shown provided with inwardly extending flanges 42 adapted to abuttingly engage each other, and to form an opening for oscillation of the member 8, when the members are secured together by bolts 43, whereby a housing 44 is provided, adapted to receive a suitable carrying wheel 45. The wheel 45 is mounted on a shaft 46 axially disposed within the sections 8—8, and to the outer ends of which the carrying wheels 9 at the ends of the carriage are suitably secured. The center wheel 45 is preferably of the same diameter as the end wheels 9 and roll upon the track 22, thereby to support the intermediate portion or center of the carriage, so that it cannot sag or deflect from weight or working strains. When the center wheel 45 is of the same diameter as the end wheels 9, it may be non-rotatably secured to the shaft 46, but in some instances, it may be found desirable to use a center wheel of smaller diameter than the wheels 9, in which case the center wheel is loosely mounted on the shaft 46 to permit it to rotate relatively thereto. The coupling members 36 thus cooperate to secure the tubular sections 8 of the carriage together for operation as a single unit, and they also cooperate to provide a housing for the center wheel 45, as will be clearly understood by reference to Figures 3 and 4.

The lower portion of the center housing 47, as the coupling members 36 will hereinafter be referred to, is shown provided at its bottom with an opening 48, adapted to receive the upper portion of the track 22, and to allow the carriage 7 to oscillate freely about the axis of the shaft 46, in the operation of the machine. Suitable wiper elements, generally indicated by the numeral 49, are pivotally supported in the opening 48 of the housing 47, at each side of the vertical center line thereof, and are adapted to wipingly engage the track 22 to prevent the accumulation of foreign matter thereon, which might effect the accuracy of the work, should the wheel 45 pass thereover. The wiper elements are preferably constructed of sheet metal formed with side members or skirts 51, which depend from the upper inclined wall 52 of the elements and have their lower edges positioned below the upper edge of the track 22, whereby foreign matter cannot readily enter the housing 47 back of the wiper elements 49. The wiper elements are shown supported by suitable pivot pins 53 secured to the coupling members 36, so as not to interfere with the free oscillating movement of the supporting member 8 of the carriage.

As best shown in Figure 1, the table supporting rails 3 and 4 are each made in two sections, and the sections of each rail are supported at the center of the machine upon suitable cross rails, generally indicated by the numerals 54. Each cross rail 54 is shown composed of two flat metallic bars 50, secured together in spaced relation by suitable spacing blocks 55 and bolts or rivets 56. The inner ends of the sections of the front rail 3 are fixedly secured to the cross rails 54 by suitable bolts 60, and the inner ends of the sections of the rear rail 4 are adjustably secured to the rails 54 by similar bolts 60, whereby the rear rail 4 may be moved towards or away from the front rail 3 to adapt the machine for handling different sizes of work. The usual work supporting centers, not shown in the drawings, are supported on the rails 3 and 4.

The cross rails 54 are spaced apart as shown at B in Figure 1, by suitable spacing blocks 70, suitably secured thereto. The spacing blocks 70 are mounted on the upper end of a pair of upright posts 57, mounted for vertical adjustment in guides 58 provided in the center frame member 25 at the front and rear of the machine. Suitable worm gearing, generally indicated by the numeral 59, is shown provided for vertically translating the posts 57. Shafts 61 are operatively connected to the worm gearing 59, and are suitably interconnected for simultaneous operation, so that the table may be conveniently raised or lowered by the manipulation of a single operating member, not shown. The cross rails 54 are spaced apart, as shown in Figures 1 and 2, to permit the posts 23 of the rails 22 to pass therebetween.

In the drawing, I have shown the cutter bar 16 of the carriage as being made of one-piece extending from end to end of the machine, and when thus constructed, the intermediate portion 62 thereof is preferably offset upwardly to provide clearance for the track 22, when the carriage is in a rearward position with respect to the work table 5. It is also to be noted, by reference to Figure 1, that no reversing mechanism is shown provided in connection with the cutter bar, whereby the machine may be used for making right and left hand patterns. It is to be understood, however, that a suitable reversing mechanism, such, for example, as illustrated in my pending application, Serial No. 20,041, may be embodied in the construction of the carriage, if desired. This part of the mechanism, however, forms no part of the present invention and it has therefore been omitted from the present case.

Figures 6 to 9, inclusive, illustrate a modified construction wherein the intermediate portion of the carriage is supported on a track shown suspended from a structural frame supported over the work table. As best shown in Figure 6, an auxiliary frame member 63, is arranged in opposed relation to the member 6 of the machine frame, and has its ends secured to the upper ends of the upright portions of the side frame members 2 of the machine frame. To the longitudinally extending frame members 6 and 63 are secured a plurality of upright members 64 to the upper ends of which are secured longitudinally extending rails 65, preferably of angular cross-section. Suitable diagonal braces 66 and horizontal braces 67 secure together the frame members 6, 63, and 65, to provide a structural frame extending from end to end of the machine and which preferably is supported entirely upon the end frame members 2—2 of the machine.

Figure 9:
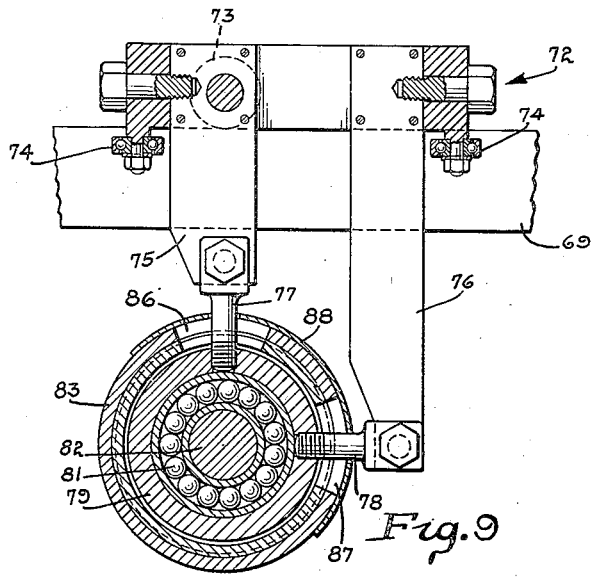
Figure 9 is a detail sectional view on the line 9—9 of Figure 8.
Figures 8, 10:
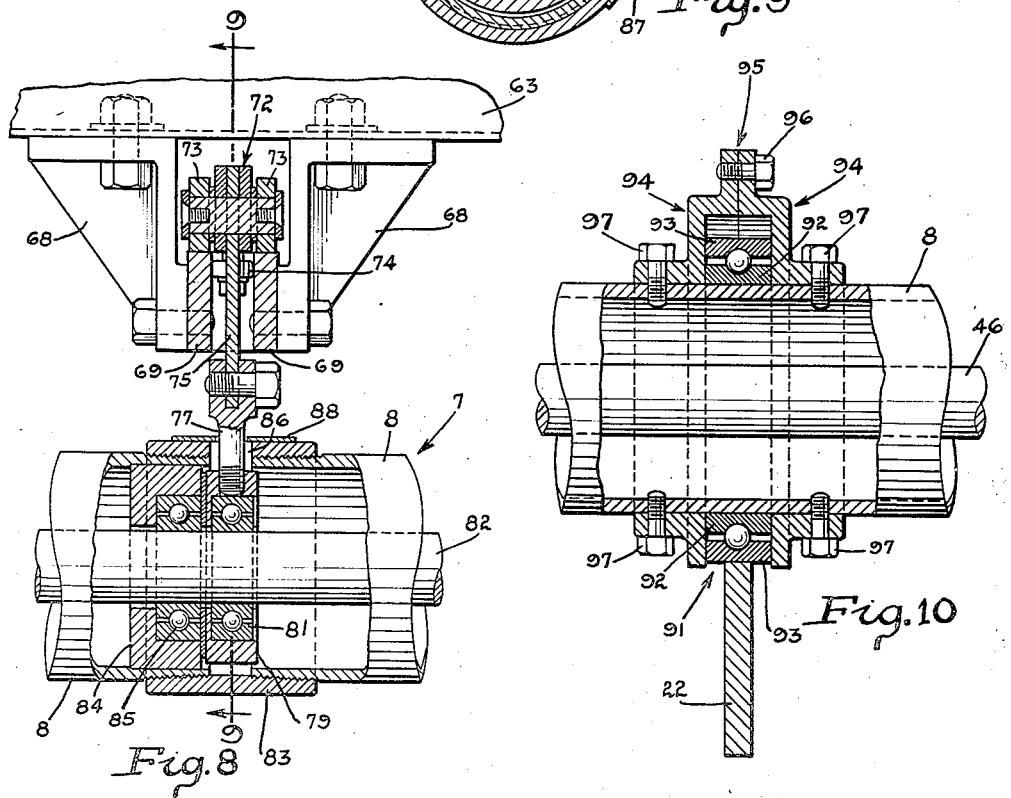
Figure 8 is a vertical sectional view on the line 8—8 of Figure 6, showing a trolley for supporting the intermediate portion of the carriage.
Figure 10 shows a center support for the carriage wherein the tubular supporting member of the carriage comprises an integral member extending substantially the length of the machine.

Suspended from the rails 6 and 63 by suitable brackets 68 is a pair of spaced parallel tracks 69, spaced apart by suitable spacing blocks 71, shown in dotted lines in Figure 6 and full lines in Figure 7. A trolley, generally indicated by the numeral 72, is shown comprising a frame having a pair of rollers 73 mounted therein and adapted to travel on the spaced tracks 69, as best shown in Figures 7, 8, and 9. Suitable guide rollers 74 are provided in the frame of the trolley 72, and are received between and engage the rails 69, thereby to guide the trolley in its movement on the tracks 69.

The frame of the trolley is shown comprising downwardly extending portions 75 and 76, provided with studs 77 and 78, respectively, shown having their terminals received in threaded engagement with a bearing member 79, supporting an anti-friction bearing 81, the inner race of which is mounted on a shaft 82 corresponding to the shaft 46, shown in Figure 3.

In the form shown in Figures 8 and 9, the inner ends of the tubular sections 8 of the carriage 7 are secured together by a suitable coupling 83, received in threaded engagement with the adjacent ends of the sections 8, as clearly illustrated in Figure 8. A bearing member 84 is fitted into the end of one of the sections 8, as shown, for example, at the left hand side of Figure 8, and supports an anti-friction bearing 85, the outer race of which is supported in the member 84, and whose inner race is fitted to the shaft 82. Thus, the inner ends of the sections 8—8 of the carriage are supported on the bearing 85, while the bearing 81 supports the weight of the intermediate or center portion of the carriage 7, as a result of the member 79 being supported from the trolley 72, as is clearly illustrated in Figures 8 and 9.

To permit free and unrestricted oscillatory movement of the carriage about the axis of the shaft 82, the studs 77 and 78 of the trolley pass through suitable elongated openings or slots 86 and 87, respectively, provided in the coupling member 83, as best shown in Figure 9. A suitable guard or closure 88 is provided with apertures to receive the studs 77 and 78, and is formed to fit over the periphery of the coupling 83, thereby to close the slots 86 and 87 to prevent foreign matter from entering therein, when the machine is in operation. If desired, suitable wiper elements and housings may be provided for the rollers or wheels 73 of the trolley 72 to prevent accumulation of foreign matter upon the tracks 69. Because of the tracks 69 being disposed over the work table 5, as shown in Figure 6, wiper elements for cleaning the tracks 69 may, in most cases, be dispensed with, as shavings and chips from the work are not likely to lodge on the tracks 69.

Figure 10 illustrates a center support comprising a bearing, generally indicated by the numeral 91, having an inner race 92 shown fitted directly onto the tubular supporting member 8 of the carriage. In the form here shown, the member 8 consists of one piece extending substantially the full length of the machine. The outer ball race 93 of the bearing 91 is adapted to roll on the track 22 in a manner similar to the wheel 45, shown in Figure 3. It will be noted that the ball race 93, which serves as a carrying wheel for the intermediate portion of the carriage, is not connected to or secured to the shaft 46, as is the center wheel 45, shown in Figure 3. Because of the center carrying wheel or ball race 93 being mounted for rotation independently of the shaft 46, the outside diameter thereof need not be the same as the diameter of the wheels 45 at the ends of the carriage, as any differential in rotation between the wheel 45 and ball race 93 will have no effect upon the rolling action of the carriage on the tracks 22.

A suitable housing, generally indicated by the numeral 94, encloses the bearing 91, and is preferably provided with suitable wiping elements, (not shown), similar to the ones shown in Figure 4. The housing 94 is preferably split, as indicated at 95 in Figure 10, and the two halves thereof are suitably secured together by bolts 96. The sections of the housing 94 are secured to the tubular member 8 of the carriage by such means as bolts 97.

In Figures 11 and 12, there is shown a machine whose frame is so constructed as to provide a passageway or station 98 at the center of the machine adapted to accommodate an operator, and whereby the operator may be stationed within the confines of the machine frame, in close proximity to the usual pattern, whereby he may conveniently guide the follower on the cutter bar around the contour of the pattern from which the work is fashioned, with a minimum of effort, regardless of the size and nature of the work.

This is a very desirable feature in machines of this general character, particularly when operating on work which is comparatively long, or extends quite a distance rearwardly from the front of the machine, as it permits the operator to always stand within convenient reach of the follower, whereby he may conveniently guide it around the profile of the pattern, as hereinbefore stated.

Thus, by the provision of the station 98, shown in Figure 11, the operator need not reach or stretch his arms over the front of the machine frame to manipulate the follower, as is now usually necessary when operating machines of ordinary construction, thereby greatly simplifying the operation of guiding the follower around the pattern, and rendering it far more convenient and less fatiguing.

To construct the machine, as illustrated in Figures 11 and 12, I propose to use two intermediate frame members 99 and 101, corresponding in general construction to the frame member 25, shown in Figure 2. The rear ends of the intermediate frame members 99 and 101 may be secured together by a structural frame, generally indicated by the numeral 103, the upper and lower rails 100 of which are secured to the frame members 99 and 101 by suitable means, not shown, thereby to space said frame members apart and retain them in such spaced relation. The lower ends of the frame members 99 and 101 may be suitably secured to the floor or to some other suitable support, as is customary in apparatus of this general character.

In the form shown in Figures 11 and 12, the center rail 22 is supported in a manner similar to the end rails 11, or, in other words, by posts 23 and 24, shown received in sockets provided in lugs 102, preferably integrally formed on the frame member 99. Cross rails 54 are provided on the frame members 99 and 101 to support the inner ends of the beams 3—3 and 4—4. These rails are supported on posts 57 mounted for vertical adjustment in guides 58, similar to those shown in Figure 2. The posts 57 at the ends and center of the machine are vertically adjustable by suitable worm gears 59, operated by the shafts 61, and all of said shafts are preferably operatively connected together for simultaneous operation, by manipulation of a single control member, not shown in the drawings, whereby all of the posts 57 may be vertically translated at the same time, thereby to maintain the top of the table level with respect to the carriage at all times.

From actual experience, I have found that by supporting the center or intermediate portion of the carriage as herein disclosed, the carriage cannot deflect from its normal course of travel, as a result of weight or strains exerted thereon, whereby the resultant work may be accurately formed provided, of course, that the operator will keep the follower in accurate contact with the pattern at all times during the operation of the machine.

The opening 48 provided in the lower portion of the housing 47 permits free oscillatory movement of the carriage at all times, and the wiper elements supported in said opening prevent foreign matter from accumulating on the track 22, whereby the center wheel 45 may travel forwardly and backwardly on the track without interference. The passageway, indicated at 98 in Figure 11, is also of utmost importance, in that it permits the operator to stand within convenient reach of the pattern, when operating on long work, whereby he may conveniently guide the follower around and over the contour of the pattern, without having to stretch or unduly exert himself, as is frequently necessary in machines which are not provided with such a passageway at their intermediate portion.

The center support for the carriage herein illustrated, may also readily be applied to conventional carving machines without materially altering the construction thereof, whereby such machines may be made to produce accurate results, regardless of size.

While I have herein shown the carriage guided in its forward and backward movement by flexible bands 13 provided at the ends of the carriage, it is to be understood that, if deemed necessary, a suitable drum 12 may be provided on the carriage adjacent to the center support, and provided with suitable bands 13 similar to those provided at the ends of the machine. In most cases, however, the bands provided at the ends of the carriage will be sufficient to accurately guide the carriage in its forward and backward movement whereby its longitudinal axis will always be maintained in parallel relation to the longitudinal center line of the work supporting table, which is of utmost importance in machines of this character, in order to insure that the resultant work will be accurately formed, and that all pieces of work produced at one time will be exact duplicates.

I claim as my invention:

1. In an apparatus of the class described, a frame, work supporting means, a track adjacent each end of the frame, a carriage mounted for traveling movement on said tracks, cutting tools on the carriage and an intermediate support for the carriage including a track adapted to engage and support the portion of the carriage intermediate the tracks at each end of the frame.

2. In an apparatus of the class described, a frame, work supporting means, a track adjacent each end of the frame, a carriage mounted for traveling movement on said tracks and including a longitudinally disposed supporting member, an intermediate support for the carriage comprising a track, and a wheel on the longitudinally disposed member adapted to roll on said center track and thereby support the carriage intermediate the tracks at each end of the frame.

3. In an apparatus of the class described, a frame, work supporting means, a track adjacent each end of the frame, a carriage mounted for traveling movement on said tracks and including a longitudinally disposed supporting member, an intermediate support for the carriage, comprising a track supported on the machine frame, and a wheel on the longitudinally disposed member adapted to roll on said intermediate track.

4. In an apparatus of the class described, a frame including an intermediate member, a work supporting table, a track adjacent each end of the frame, a carriage mounted for traveling movement on said tracks and including a longitudinally disposed member, a carrying wheel mounted on the intermediate portion of said member, and a track supported on said intermediate frame member and adapted to be engaged by said wheel, thereby to support the intermediate portion of the carriage.

5. In an apparatus of the class described, a frame, a work supporting table, a track adjacent each end of the frame, a carriage mounted for traveling movement on said tracks and including a longitudinally disposed member having a carrying wheel mounted on the intermediate portion thereof, a fixed track adapted to be engaged by said wheel, thereby to support the intermediate portion of the carriage, and a housing enclosing said wheel and having means permitting free oscillatory movement of the carriage about the axis of said longitudinally disposed member.

6. In an apparatus of the class described, a frame, a work supporting table, a track adjacent each end of the frame, a carriage mounted for traveling movement on said tracks and including a longitudinally disposed member, a carrying wheel mounted on the intermediate portion of said member, a track supported on said frame and adapted to be engaged by said wheel, thereby to support the intermediate portion of the carriage, and a housing enclosing said wheel and having an opening in the lower portion thereof for receiving said track, said opening permitting free oscillatory movement of the carriage about the axis of said longitudinally disposed member.

7. In an apparatus of the class described, a frame, a work supporting table, a track adjacent each end of the frame, a carriage mounted for traveling movement on said tracks and including a longitudinally disposed member composed of two sections, coupling members securing together said sections and cooperating to form a housing, a carrying wheel mounted on the carriage within said housing, and an auxiliary track engaged by said wheel and cooperating therewith to support the intermediate portion of the carriage.

8. In an apparatus of the class described, a frame, a work supporting table, a track adjacent each end of the frame, a carriage mounted for traveling movement on said tracks and including a longitudinally disposed member composed of two sections, coupling members securing together said sections at the intermediate portion of the carriage and cooperating to form a housing, a carrying wheel mounted on the carriage within said housing, a track supported on the machine frame and engaging said wheel to provide a support for the intermediate portion of the carriage, and means in said housing whereby the carriage may be freely oscillated about the axis of said longitudinally disposed member, when moved forwardly and backwardly on said tracks.

9. In an apparatus of the class described, a frame, a work supporting table, a track adjacent each end of the frame, a carriage mounted for traveling movement on said tracks and including a longitudinally disposed member composed of two sections, a shaft extending lengthwise through said member and provided at each end with a carrying wheel adapted to roll on said tracks, coupling members securing together said sections at the intermediate portion of the carriage, said coupling members cooperating to form a housing, a carrying wheel mounted on said shaft within the housing, and an auxiliary track engaging said center wheel and cooperating therewith to support the intermediate portion of the carriage, and retain it in true axial alinement.

10. In an apparatus of the class described, a frame, a work supporting table, a track adjacent each end of the frame, a carriage mounted for traveling movement on said tracks and including a longitudinally disposed member composed of two sections, coupling members securing together said sections at a point intermediate the ends of the carriage, said coupling members cooperating to form a housing, a carrying wheel mounted on the carriage within said housing, an auxiliary track engaged by said wheel and cooperating therewith to support the intermediate portion of the carriage, and wiper elements carried by the housing and engaging said auxiliary track to prevent accumulation of foreign matter thereon.

11. In an apparatus of the class described, a frame, a work supporting table, a track adjacent each end of the frame, a carriage mounted for traveling movement on said tracks and including a longitudinally disposed member extending substantially the length of the apparatus, and means for supporting the intermediate portion of said member comprising an auxiliary track supported on said frame, and an annular member rotatably mounted on said member and adapted to roll on said auxiliary track.

12. In an apparatus of the class described, a frame, a work supporting table thereon, a track adjacent each end of the frame, a carriage mounted for traveling movement on said tracks and including a longitudinally disposed member extending substantially the length of the apparatus, and means for supporting the intermediate portion of said member comprising an auxiliary track supported on said frame, an annular member mounted for relative rotation on said longitudinal member and adapted to roll on said auxiliary track, and a housing enclosing said annular member and having means embodied in the construction thereof for permitting free oscillatory movement of the carriage about the axis of the longitudinal member.

13. In an apparatus of the class described, a frame, a work supporting table, a track adjacent each end of the frame, a carriage mounted for traveling movement on said tracks and carrying a plurality of cutting tools, and a centrally disposed support for said carriage comprising an overhead track, and a trolley secured to the intermediate portion of the carriage and arranged to travel on said overhead track.

14. In an apparatus of the class described, a frame, a work supporting table, a track adjacent each end of the frame, a carriage mounted for traveling movement on said tracks and including a longitudinally disposed supporting member, a center support for said member comprising an overhead track, a trolley on said track connected to the longitudinally disposed member, thereby to prevent deflection of the intermediate portion of the carriage, and means embodied in the connection between the trolley and said member permitting free oscillatory movement of the carriage about the axis of the longitudinal member.

15. In an apparatus of the class described, a frame comprising two sections spaced apart at an intermediate portion of the machine to provide a passageway or station for an operator, work supporting means on the frame, tracks on said frame, and a carriage mounted for traveling movement forwardly and backwardly on said tracks and including a follower, said passageway or station permitting the operator to be stationed within the confines of the machine frame, whereby he may conveniently guide the follower on the pattern with a minimum of effort, when operating on relatively long work.

16. In an apparatus of the class described, a frame adapted to support a pattern adjacent the center of the machine, work supporting means on the frame, a plurality of tracks, a carriage mounted for traveling movement on said tracks and including a follower, and means providing a passageway or station for an operator adjacent the center of the machine and within the confines of the machine frame, whereby the operator may conveniently guide the follower on the pattern, regardless of the width or length of the work.

17. In an apparatus of the class described, a frame composed of two sections spaced apart at substantially the center of the machine to provide a passageway or station for an operator, work supporting means on the frame, a carriage mounted for traveling movement over said work supporting means and including a follower, and means for supporting the carriage including a center support supported directly on the machine frame, said passageway or station permitting the operator to stand within the confines of the machine frame adjacent to the pattern, whereby he may conveniently guide the follower around and over the contour of the pattern, regardless of the size of the work.

18. In an apparatus of the class described, a frame comprising two sections spaced apart at an intermediate portion of the machine to provide a passageway or station for an operator, work supporting means on the frame, a plurality of tracks, a carriage mounted for traveling movement on said tracks and including a follower, means for supporting the intermediate portion of the carriage on the machine frame to prevent deflection thereof, and said passageway providing a station for an operator within the confines of the machine frame, whereby the operator may conveniently guide the follower on the pattern, regardless of the size of the work.

JOHN GALBRAITH.